United States Patent
Sleeman et al.

(10) Patent No.: US 11,726,609 B2
(45) Date of Patent: Aug. 15, 2023

(54) TOUCH-SENSITIVE APPARATUS AND METHOD

(71) Applicant: TouchNetix Limited, Fareham (GB)

(72) Inventors: Peter Timothy Sleeman, Fareham (GB); Stephen William Roberts, Fareham (GB)

(73) Assignee: TouchNetix Limited, Fareham/Hampshire (GB)

( * ) Notice: Subject to any disclaimer, the term of this patent is extended or adjusted under 35 U.S.C. 154(b) by 70 days.

(21) Appl. No.: 17/615,672

(22) PCT Filed: Jun. 8, 2020

(86) PCT No.: PCT/EP2020/065876
§ 371 (c)(1),
(2) Date: Dec. 1, 2021

(87) PCT Pub. No.: WO2020/249525
PCT Pub. Date: Dec. 17, 2020

(65) Prior Publication Data
US 2022/0236868 A1    Jul. 28, 2022

(30) Foreign Application Priority Data
Jun. 10, 2019 (GB) ..................... 1908243

(51) Int. Cl.
*G06F 3/041* (2006.01)
*G06F 3/044* (2006.01)
*G06F 3/047* (2006.01)

(52) U.S. Cl.
CPC ........ *G06F 3/041662* (2019.05); *G06F 3/047* (2013.01); *G06F 3/0412* (2013.01); *G06F 3/0446* (2019.05)

(58) Field of Classification Search
CPC .................................... G06F 3/041662
(Continued)

(56) References Cited

U.S. PATENT DOCUMENTS

2014/0267146 A1    9/2014    Chang et al.
2015/0015539 A1    1/2015    Fotopoulos et al.
(Continued)

FOREIGN PATENT DOCUMENTS

WO    2011/137200 A1    11/2011

OTHER PUBLICATIONS

International Search Report and Written Opinion of the International Searching Authority for corresponding International Patent Application No. PCT/EP2020/065876, dated Aug. 17, 2020.
(Continued)

*Primary Examiner* — Calvin C Ma
(74) *Attorney, Agent, or Firm* — Renner, Otto, Boisselle & Sklar (57) ABSTRACT

A touch-sensitive apparatus, the apparatus comprising: a touch-sensitive element comprising an array of electrodes having a first electrode and a second electrode, the second electrode spatially intersecting the first electrode at an intersection point; and measurement circuitry configured to: measure the mutual capacitance at the intersection point of the first and second electrodes; measure the self-capacitance of the first electrode, and measure the self-capacitance of the second electrode; and processing circuitry configured to: determine the presence of a touch on the touch-sensitive element on the basis of a comparison of the measured mutual capacitance at the intersection point to a first threshold and on the basis of a combination of the measured self-capacitance of the first electrode and the measured self-capacitance of the second electrode being greater than or equal to a second threshold.

16 Claims, 6 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2015/0049043 A1 | 2/2015 | Yousefpor et al. | |
| 2016/0154507 A1* | 6/2016 | Bharathan ............. | G06F 3/0441 345/174 |
| 2016/0209953 A1 | 7/2016 | Kim et al. | |
| 2017/0364184 A1 | 12/2017 | Weinerth et al. | |
| 2019/0034028 A1 | 1/2019 | Stevenson | |
| 2020/0387249 A1* | 12/2020 | Shimada ................. | G06F 3/044 |
| 2021/0041975 A1* | 2/2021 | Uchino ................... | G06F 3/044 |

OTHER PUBLICATIONS

GB Combined Search and Examination Report issued for corresponding GB Application No. 1908243.7, dated Oct. 29, 2019.

* cited by examiner

TOUCH-SENSITIVE APPARATUS AND METHOD

This application is a national phase of International Application No. PCT/EP2020/065876 filed Jun. 8, 2020, which claims priority to United Kingdom Application No. 1908243.7 filed Jun. 10, 2019, the entire disclosures of which are hereby incorporated by reference.

BACKGROUND OF THE INVENTION

The present invention relates to the field of touch sensors, for example touch sensors for overlying a display screen to provide a touch-sensitive display (touch screen). In particular, embodiments of the invention relate to processing techniques for determining the presence of a genuine touch on a touch sensitive surface of a touch sensitive apparatus even in the presence of conductive objects not corresponding to a touch on the touch sensitive surface.

A capacitive touch sensor can be generalised as one that uses a physical sensor element comprising an arrangement of electrically conductive electrodes extending over a touch sensitive area (sensing area) to define sensor nodes and a measurement circuitry connected to the electrodes and operable to measure changes in the electrical capacitance of each of the electrodes or the mutual-capacitance between combinations of the electrodes. The electrodes are typically provided on a substrate. There are advantages and disadvantages to both of the measurement techniques. Measuring the changes in the electrical capacitance of each of the electrodes generally provides a much stronger signal than measuring the mutual-capacitance between combinations of the electrodes; however this technique is, conventionally, unable to accurately determine the locations of multiple touches on the touch sensitive area.

Hence, in certain applications, measuring the mutual capacitance between combinations of electrodes is preferred. However, for these systems, certain objects which are not resulting from a genuine touch (e.g., a human finger or a stylus) can be placed on or brought in to contact with the touch sensitive area and the presence of such objects affects the mutual capacitance between the electrodes. Therefore, in these systems it can be difficult to distinguish between a genuine touch on/within the touch sensitive area provided by a user (e.g., a user's finger) versus a false touch caused by the presence of the object on the touch sensitive area. There is therefore a desire to provide touch sensors with the ability to more accurately distinguish between genuine touches and false touches caused by the presence of such objects.

SUMMARY OF THE INVENTION

According to a first aspect of the invention there is provided a touch-sensitive apparatus, the apparatus comprising: a touch-sensitive element comprising an array of electrodes having a first electrode and a second electrode, the second electrode spatially intersecting the first electrode at an intersection point; and measurement circuitry configured to: measure the mutual capacitance at the intersection point of the first and second electrodes; measure the self-capacitance of the first electrode, and measure the self-capacitance of the second electrode; and processing circuitry configured to: determine the presence of a touch on the touch-sensitive element on the basis of a comparison of the measured mutual capacitance at the intersection point to a first threshold and on the basis of a combination of the measured self-capacitance of the first electrode and the measured self-capacitance of the second electrode being greater than or equal to a second threshold.

In accordance with certain aspects the processing circuitry is configured to determine the presence of a galvanically isolated conductive object on the touch-sensitive element on the basis of a comparison of the measured mutual capacitance at the intersection point to the first threshold and on the basis of a combination of the measured self-capacitance of the first electrode and the measured self-capacitance of the second electrode being less than or equal to the second threshold.

In accordance with certain aspects the processing circuitry is configured to calculate the product of the measured self-capacitance of the first electrode and the measured self-capacitance of the second electrode as the combination of the measured self-capacitance of the first electrode and the measured self-capacitance of the second electrode.

In accordance with certain aspects the touch-sensitive apparatus further comprises a plurality of intersection points corresponding to locations at where respective ones of the plurality of electrodes intersect, and wherein the processing circuitry is configured to determine the presence or absence of a touch on the touch-sensitive element at each of the plurality of intersection points.

In accordance with certain aspects the processing circuitry is configured to calculate the product of the measured self-capacitances of any pair of intersecting electrodes corresponding to one of the intersection points, and wherein the processing circuitry is configured to compare the product of the measured self-capacitance of each of the pairs of electrodes with respect to the second threshold.

In accordance with certain aspects the processing circuitry is configured to instruct the measurement circuitry to perform the self-capacitance measurements of the array of electrodes depending upon the result of the comparison of the measured mutual capacitance at the intersection point to the first threshold.

In accordance with certain aspects processing circuitry is configured to instruct the measurement circuitry to perform the self-capacitance measurements on the electrodes corresponding to ones of the plurality of intersection points at which it is determined that the comparison of the measured mutual capacitance at the intersection point to the first threshold corresponds to the presence of a touch or the presence of a galvanically isolated conductive object at the intersection point.

In accordance with certain aspects the processing circuitry is configured to determine a change in the measured mutual capacitance by calculating the difference between the measured mutual capacitance at the intersection point and a reference value, and to determine the presence of a touch on the touch-sensitive element when the change in the measured mutual capacitance is greater than or equal to the first threshold and when the combination of the measured self-capacitance of the first electrode and the measured self-capacitance of the second electrode is greater than or equal to the second threshold.

In accordance with certain aspects the processing circuitry is configured to determine that no touch is present on the touch-sensitive element when one or both of: the change in measured mutual capacitance at the intersection point is less than the first threshold, and the combination of the measured self-capacitance of the first electrode and the self-capacitance of the second electrode is less than the second threshold.

In accordance with certain aspects the reference value is a value of the mutual capacitance between the first and second electrodes in the absence of a touch and galvanically isolated conductive object on the touch-sensitive element.

In accordance with certain aspects each intersection point has a corresponding reference value, and wherein the processing circuitry is configured to update the reference value with the measured mutual capacitance value when it is determined that galvanically isolated conductive object is present on the touch-sensitive element at the intersection point.

According to a second aspect of the invention there is provided a system comprising the touch-sensitive apparatus of any preceding claim, further comprising system processing circuitry communicatively coupled to the processing circuitry of the touch-sensitive apparatus.

In accordance with certain aspects the system processing circuitry is configured to cause the system to perform a first action in response to receiving a signal output from the processing circuitry of the touch-sensitive apparatus indicating the presence of a touch on the touch-sensitive element.

In accordance with certain aspects, the system processing circuitry is configured to cause the system to perform a second action in response to receiving a signal output from the processing circuitry of the touch-sensitive apparatus indicating the presence of galvanically isolated conductive object on the touch-sensitive element.

According to a third aspect of the invention there is provided a method for determining the presence of a touch on a touch-sensitive element of a touch-sensitive apparatus, the apparatus comprising the touch-sensitive element comprising an array of electrodes having a first electrode and a second electrode, the second electrode spatially intersecting the first electrode at an intersection point, the method comprising: measuring the mutual capacitance at the intersection point of the first and second electrodes; comparing the measured mutual capacitance at the intersection point to a first threshold to determine whether a touch and/or a galvanically isolated conductive object is present at the intersection point; measuring the self-capacitance of the first electrode; measuring the self-capacitance of the second electrode; and determining the presence of a touch on the touch-sensitive element on the basis of the comparison of the measured mutual capacitance at the intersection point to the first threshold and on the basis of a combination of the measured self-capacitance of the first electrode and the measured self-capacitance of the second electrode being greater than or equal to a second threshold.

In accordance with certain aspects measuring the self-capacitance of the first electrode and measuring the self-capacitance of the second electrode occur in response to the determining that a touch and/or a galvanically isolated conductive object is present at the intersection point.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

The present disclosure relates broadly to a touch sensitive apparatus (which comprises an array of electrodes forming a touch sensitive surface) which is configured to operate in (that is, make measurements in) both the mutual-capacitance measurement mode and the self-capacitance measurement mode. In particular, in the broadest sense, the apparatus performs a mutual-capacitance scan of the electrode array followed by a self-capacitance scan of the electrode array. The presence of certain objects, not corresponding to a genuine touch, on a touch sensitive surface has been found to strongly affect the mutual-capacitance between combinations electrodes, but only weakly affect the self-capacitance. In this regard, a genuine touch can be detected when a signal is detected in both the mutual-capacitance scan and the self-capacitance scan. Furthermore, the touch sensitive apparatus is configured to combine (e.g., multiply) the self-capacitance measurements of combinations of electrodes. A single self-capacitance measurement for an electrode indicates whether a touch is detected at any location along the electrode, but it is not capable of specifying the exact location/origin of the touch. Multiplying the self-capacitance measurements from two electrodes enables the precise location at which the touch is present to be detected.

Figure 1:
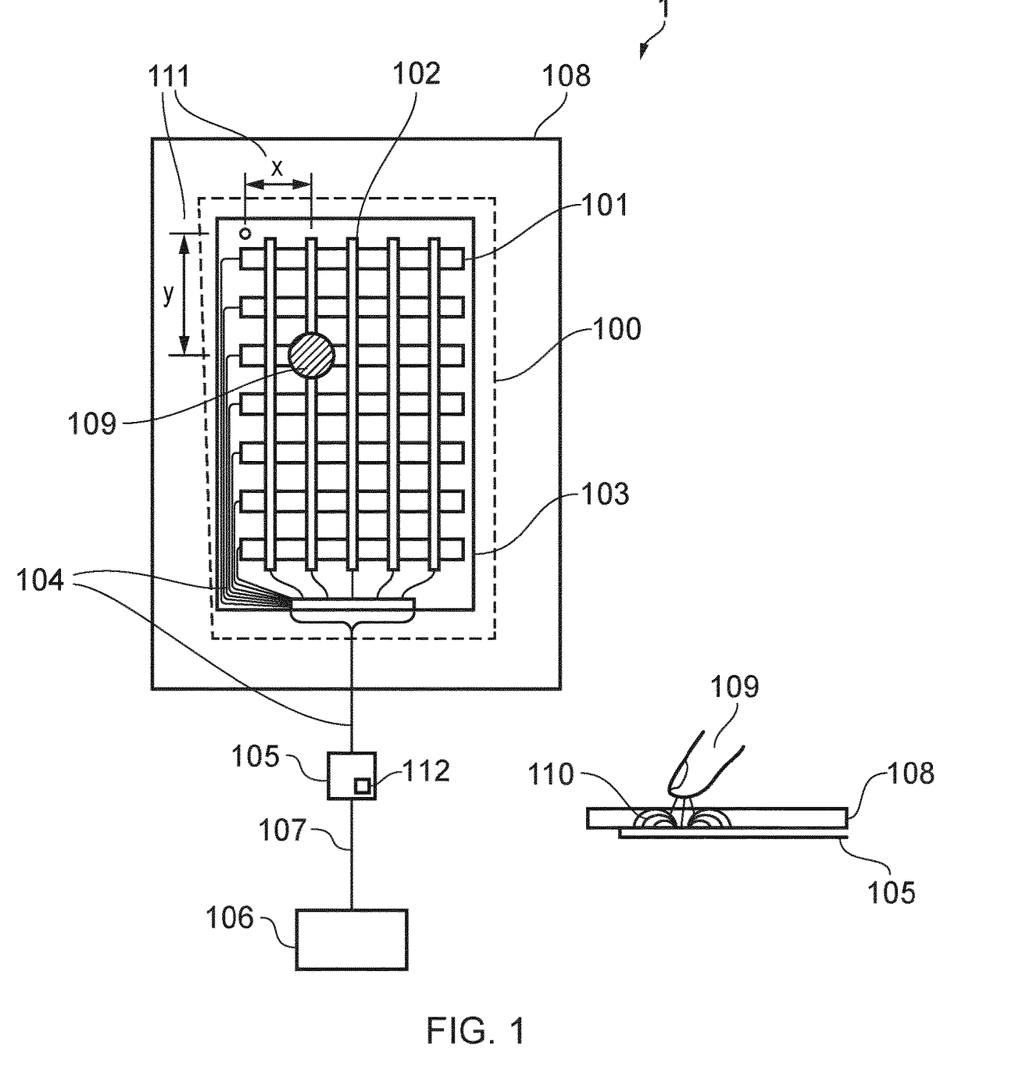
FIG. 1 schematically illustrates a touch sensitive apparatus in accordance with certain embodiments of the invention.

FIG. 1 schematically shows a touch-sensitive apparatus 1 in accordance with the principals of the present disclosure. The touch-sensitive apparatus 1 is represented in plan view (to the left in the figure) and also in cross-sectional view (to the right in the figure).

The touch-sensitive apparatus 1 comprises a sensor element 100, measurement circuitry 105, processing circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, more generally, be referred to as the controller of the touch-sensitive apparatus 1.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch.

In some cases, each electrode may have a more detailed structure than the simple "bar" structures represented in FIG. 1, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4). Referring back to FIG. 1, the electrodes 101, 102 are electrically connected via circuit conductors 104 to measurement circuitry 105, which is in turn connected to processing circuitry 106 by means of a circuit conductor 107. The measurement circuitry 105 and/or the processing circuitry 106 may each be provided by a (micro)controller, processor, ASIC or similar form of control chip. Although shown separately in FIG. 1, in some implementations, the measurement circuitry and the processing circuitry may be provided by the same (micro)controller, processor, ASIC or similar form of control chip. The measurement circuitry 105 and/or the processing circuitry 106 may be comprised of a printed circuit board (PCB), which may further include the various circuit conductors 104, 107. The measurement circuitry 105 and the processing circuitry 106 may be formed on the same PCB, or separate PCBs. Note also that the functionality provided by either of the measurement circuitry 105 and the processing circuitry 106 may be split across multiple circuit boards and/or across components which are not mounted to a PCB. The processing circuitry 106 interrogates the measurement circuitry 105 to recover the presence and coordinates of any touch or touches present on, or proximate to, the sensor element 100.

Generally speaking, the measurement circuitry 105 is configured to perform capacitance measurements associated with the electrodes 101, 102 (described in more detail below). The measurement circuitry 105 comprises drive circuitry 112 for generating electrical signals for performing the capacitance measurements. The measurement circuitry 105 outputs the capacitance measurements to the processing circuitry 106, which is arranged to perform processing using the capacitance measurements. The processing circuitry 106 may be configured to perform a number of functions, but at the very least is configured to determine when a touch 109, caused by an object such a human finger or a stylus coming into contact with (or being adjacent to) the sense area of the sensor element 100 with appropriate analysis of relative changes in the electrodes' measured capacitance/capacitive coupling. This determination process is described in more detail below. The processing circuitry 106, as in the described implementation, may also be configured to, with appropriate analysis of relative changes in the electrodes' measured capacitance/capacitive coupling, calculate a touch position on the cover's surface as an XY coordinate 111.

In the example, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

A further aspect of capacitive touch sensors relates to the way the measurement circuitry 105 uses the electrodes of the sensor element to make its measurements. There are two main techniques for measuring capacitance, both of which are employed by the measurement circuitry 105 of the described implementation. That is to say, the measurement circuitry 105 is configured to determine capacitances of one or more of the electrodes according to both the first technique and the second technique.

Figure 2:
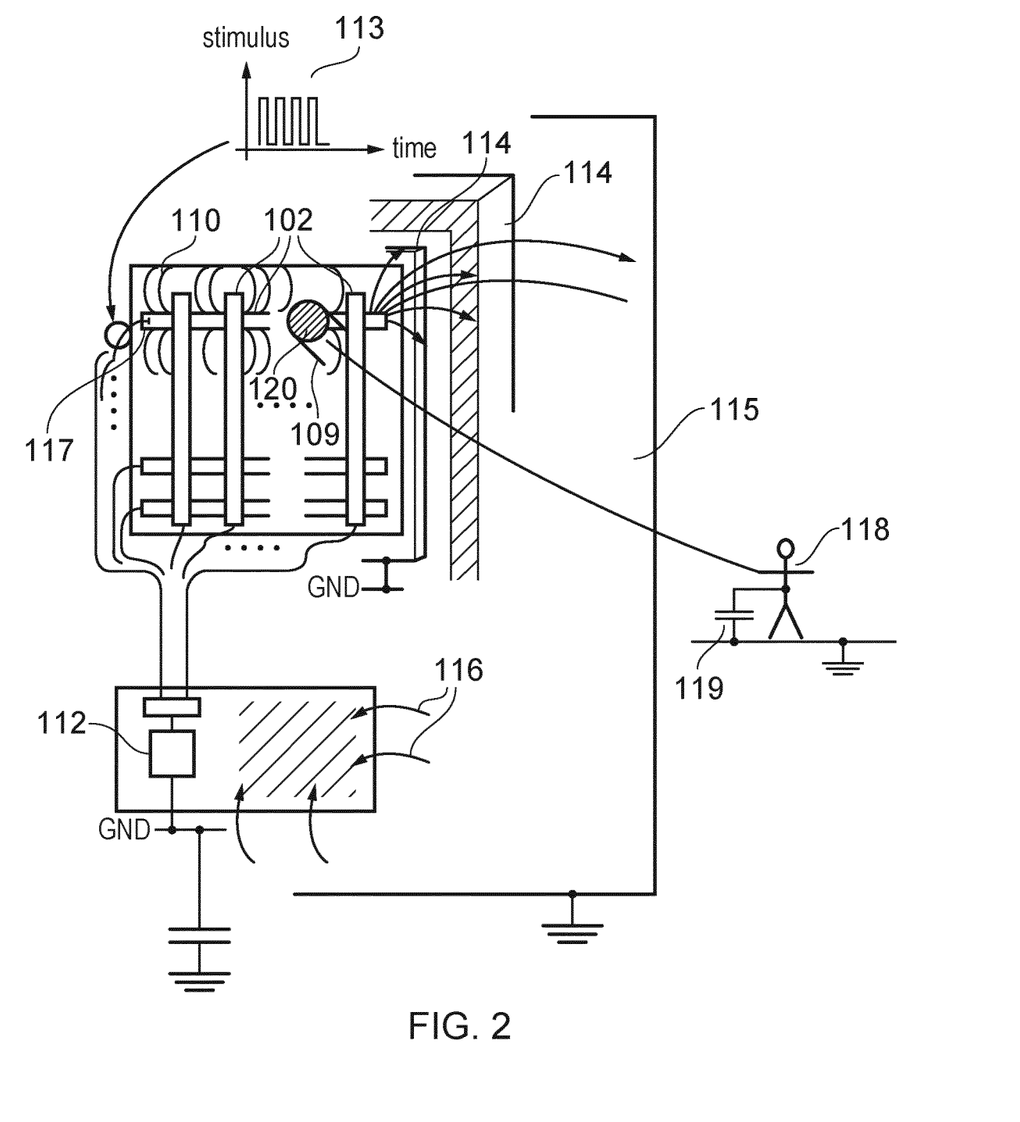
FIG. 2 schematically illustrates a self-capacitance measurement mode of the touch sensitive apparatus, specifically with a view to explaining the principles of self capacitance measurement.

A first technique is based on measuring what is frequently referred to as "self-capacitance". Reference is made to FIG. 2. In FIG. 2, the drive circuitry 112 of the measurement circuitry 105 is configured to generate and apply an electrical stimulus (drive signal) 113 to each electrode 101, 102 which will cause an electric field 110 to form around it. This field 110 couples through the space around the electrode back to the measurement circuitry 105 via numerous conductive return paths that are part of the nearby circuitry of the sensor element 100 and the product housing (shown schematically by reference numeral 114), or physical elements from the nearby surroundings 115 etc., so completing a capacitive circuit 116. The overall sum of return paths is typically referred to as the "free space return path" in an attempt to simplify an otherwise hard-to-visualize electric field distribution. The important point to realise is that the measurement circuitry 105 is only driving each electrode from a single explicit electrical terminal 117; the other terminal is the capacitive connection via this "free space return path". The capacitance measured by the measurement circuitry 105 is the "self-capacitance" of the sensor electrode (and connected tracks) that is being driven relative to free space (or Earth as it is sometimes called) i.e. the "self-capacitance" of the relevant sensor electrode. Touching or approaching the electrode with a conductive element, such as a human finger, causes some of the field to couple via the finger through the connected body 118, through free space and back to the measurement circuitry 105. This extra return path 119 can be relatively strong for large objects (such as the human body), and so can give a stronger coupling of the electrode's field back to the measurement circuitry 105;

touching or approaching the electrode hence increases the self-capacitance of the electrode. The measurement circuitry 105 is configured to sense this increase in capacitance. The increase is strongly proportional to the area 120 of the applied touch 109 and is normally weakly proportional to the touching body's size (the latter typically offering quite a strong coupling and therefore not being the dominant term in the sum of series connected capacitances).

In the described implementation, the electrodes 101, 102 are arranged on an orthogonal grid, generally with a first set of electrodes on one side of a substantially insulating substrate 103 and the other set of electrodes on the opposite side of the substrate 103 and oriented at substantially 90° to the first set. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

When the measurement circuitry 105 operates in accordance with the self-capacitance measuring mode, the measurement circuitry 105 can either drive each electrode in turn (sequential) with appropriate switching of a single control channel (i.e., via a multiplexer) or it can drive them all in parallel with an appropriate number of separate control channels. In the former sequential case, any neighbouring electrodes to a driven electrode are sometimes grounded by the measurement circuitry 105 to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the measurement circuitry 105 can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the measurement circuitry 105 if there is a voltage difference between the electrodes).

Figure 3:
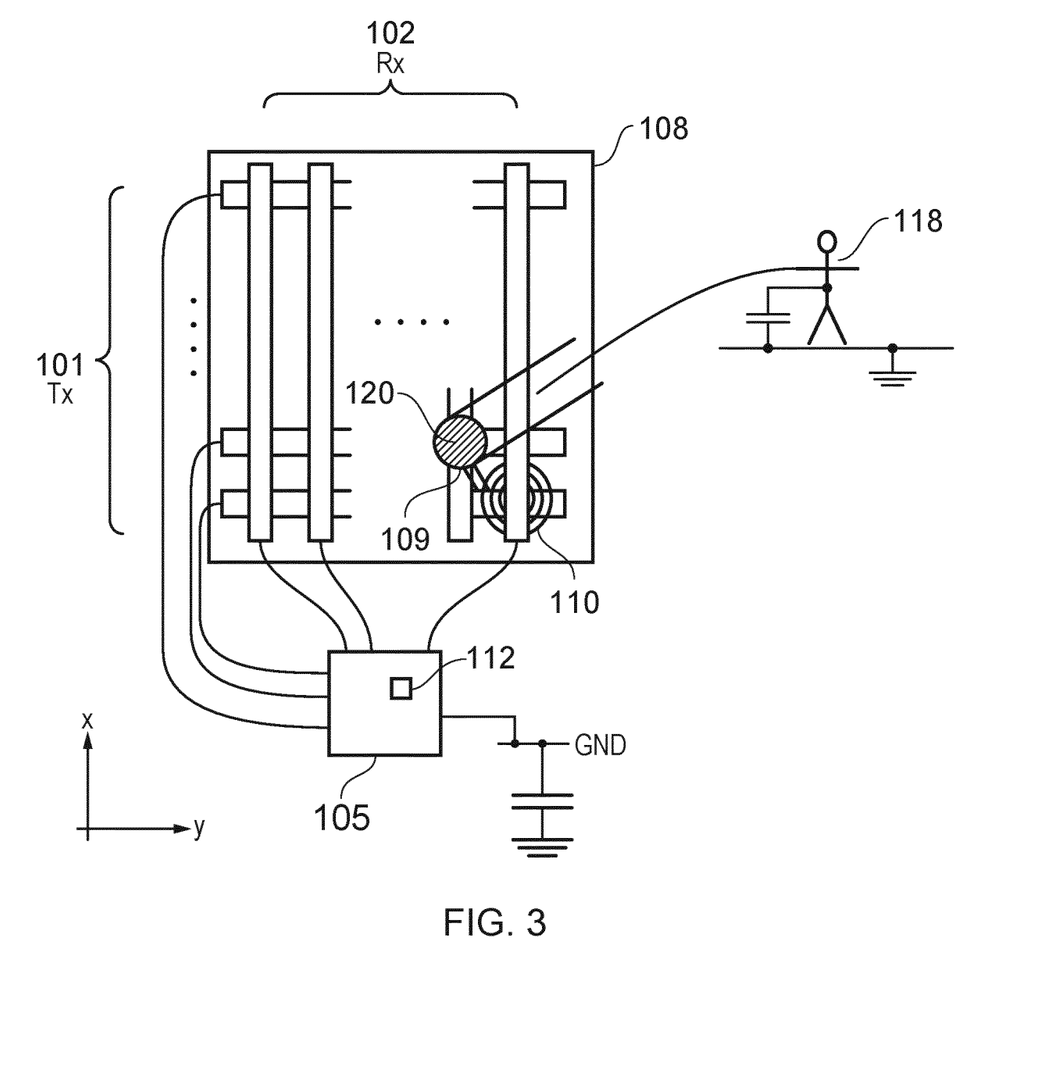
FIG. 3 schematically illustrates a mutual-capacitance measurement mode of the touch sensitive apparatus, specifically with a view to explaining the principles of mutual capacitance measurement.

A second technique is based on measuring what is frequently referred to as "mutual-capacitance". Reference is made to FIG. 3. In FIG. 3, the measurement circuitry 105 will sequentially stimulate each of an array of transmitter (driven/drive) electrodes, shown as the X electrodes 101 in FIG. 3, that are coupled by virtue of their proximity to an array of receiver electrodes, shown as the Y electrodes 102 in FIG. 3. (It should be appreciated that the Y electrodes 102 may instead be the transmitting electrodes and the X electrodes 101 may instead be the receiving electrodes in other implementations). The resulting electric field 110 is now directly coupled from the transmitter to each of the nearby receiver electrodes; the "free space" return path discussed above plays a negligible part in the overall coupling back to the measurement circuitry 105 when the sensor element 100 is not being touched. The area local to and centred on the intersection of a transmitter and a receiver electrode is typically referred to as a "node" or "intersection point". Now, on application or approach of a conductive element such as a human finger, the electric field 110 is partly diverted to the touching object. An extra return path to the measurement circuitry 105 is now established via the body 118 and "free-space" in a similar manner to that described above. However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

As described above, the transmitter electrodes and receiver electrodes in the described implementation are arranged as an orthogonal grid, with the transmitter electrodes on one side of a substantially insulating substrate 103 and the receiver electrodes on the opposite side of the substrate 103. This is as schematically shown in FIG. 3. As in FIG. 2, the first set of transmitter electrodes 101 shown on one side of a substantially insulating substrate 103 and the second set of receiver electrodes 102 is arranged at nominally 90° to the transmitter electrodes on the other side of the substrate 103. In other implementations, the electrodes may be oriented at a different angle (e.g., 30°) relative to one another. In addition, other implementations may have structures where the grid is formed on a single side of the substrate and small insulating bridges, or external connections, are used to allow the transmitter and receiver electrodes to be connected in rows and columns without short circuiting.

There are certain advantages and disadvantages associated with both of the two capacitive sensing techniques described above. Mutual capacitance techniques offer the ability to resolve multiple touches at different locations on the touch-sensitive element, while self-capacitance techniques do not, as a matter of course, provide this functionality, self-capacitance techniques generally output a much stronger signal thus increasing the sensitivity of the touch-sensitive element.

Mutual capacitance touch sensors have been favoured in applications where multiple functions are selectable (i.e., able to be input) by a user of the touch screen at any given time, either by assigning different locations on the touch screen to specific function or via gesture recognition, for example. Such arrangements offer more flexible user interaction with the touch screen/software application from a single input surface. However, it has been found that when certain objects, and more specifically galvanically isolated conductive objects, are present on the surface of the touch-sensitive element utilising a mutual capacitance technique, the touch sensor incorrectly interprets the conductive objects as a user's touch. This is because, in accordance with the mutual capacitance technique, the conductive objects on the surface of the touch-sensitive element strongly affect the capacitance between two electrically coupled electrodes.

In the following, the term "galvanically isolated conductive object" (or conductive object for short) is an electrically conductive object (e.g., such as a metal plate) which is galvanically isolated from the remaining parts of the system. In practice, what this means is that conductive objects that are present on or adjacent to the touch-sensitive element have a very low (or non-existent) ground return path. In this sense, no direct conduction path is permitted between the conductive object and ground, meaning any currents within the conductive object are effectively isolated. For instance, with reference to FIGS. 2 and 3, a ground return path is shown (schematically) between the touch 109 and ground via the human 118, and such a touch is not considered galvanically isolated due to this return path. In contrast, objects which do not have this (or an equivalent) ground return path are said to be galvanically isolated. Examples of the conductive objects may include a soft-drink can, a conductive liquid, etc.

In accordance with aspects of the present disclosure, it has been found that conductive objects only weakly affect self-capacitance measurements. In other words, conductive objects, such as those listed above, that are present on the touch-sensitive element are not readily detectable when using self-capacitance measurement techniques, in contrast to when using mutual capacitance measurement techniques. Without wishing to be bound by theory, this is due to the fact that the conductive objects present on the touch sensor do not strongly couple to ground (i.e., there is no, or a weak, return path to the circuit's ground).

The disclosure refers on the one hand to "galvanically isolated conductive objects" and on the other hand "touches". The term "touches" (or touch, or user's touch, or genuine touch) is intended to encompass objects which correspond to a user's (deliberate) input when using the touch sensitive apparatus (e.g., via a human finger or via a stylus or the like). However, it will be appreciated that the term "touches" may be extended to include non-galvanically isolated conductive objects (i.e., conductive objects which do have a ground return path). In some instances, it should be appreciated that galvanically isolated conductive objects may become non-galvanically isolated conductive objects when a ground return path can be provided, e.g., when a user touches the galvancially isolated conductive object. In the following, reference will simply be made to "touch" or "genuine touch" for conciseness, but it should be appreciated that these terms may be replaced with non-galvanically isolated conductive object.

Thus, in accordance with aspects of the present disclosure, a touch sensitive apparatus 1 is provided including processing circuitry 106 which is configured to operate in both a self-capacitance mode, in which the self-capacitance of any given electrode 101 or 102 is measured, and a mutual capacitance mode, in which the mutual capacitance between two spatially intersecting electrodes 101, 102 is measured, wherein the two modes are used to identify genuine touches on the surface of a touch screen and to compensate for the presence of a conductive object on the surface of the touch screen. This is described in more detail in accordance with FIGS. 4 and 5 below.

Figure 4:
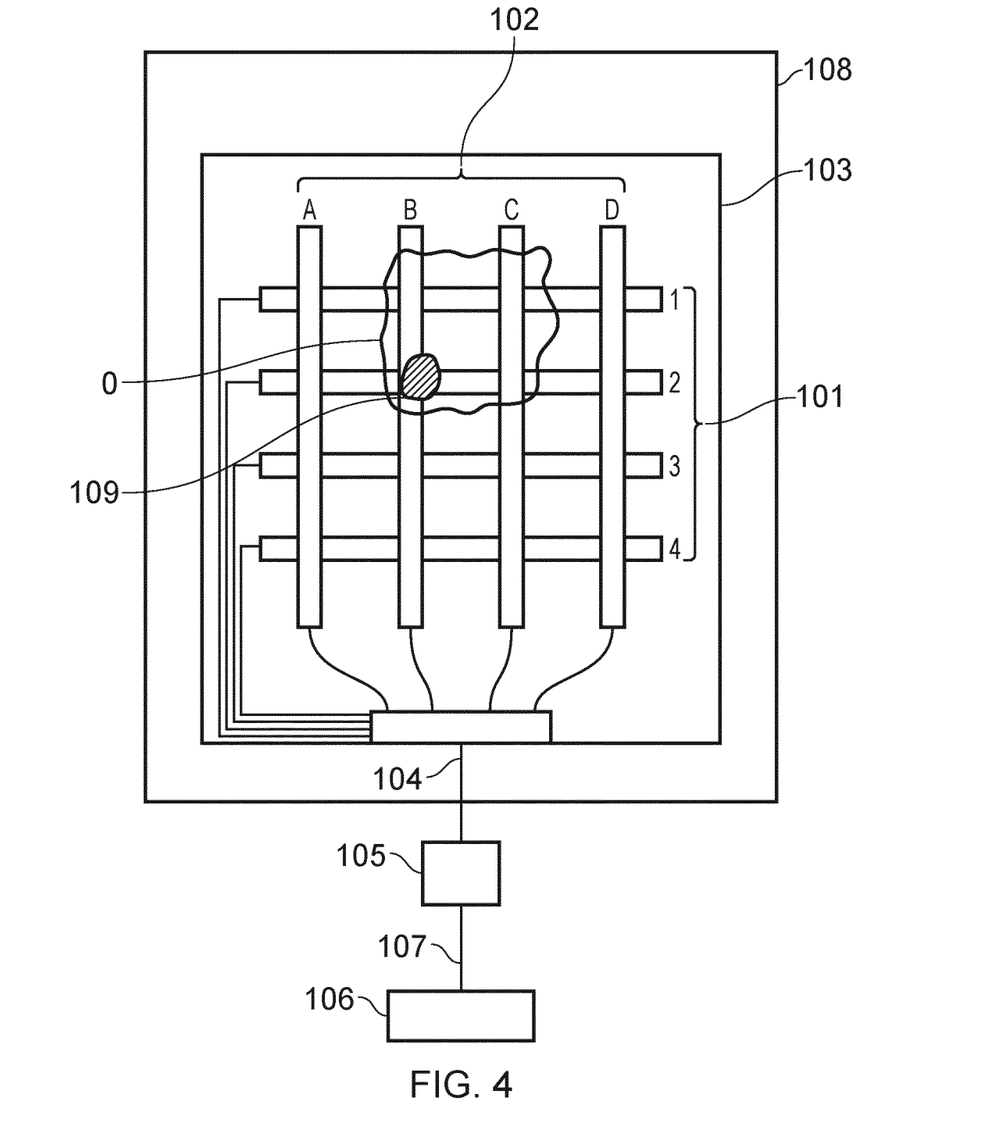
FIG. 4 schematically illustrates a touch sensitive apparatus in accordance with certain embodiments of the invention, and specifically showing an object present on the touch sensitive area of the touch sensitive apparatus.

FIG. 4 shows a touch-sensitive apparatus 1 similar to that shown in FIG. 1, although fewer electrodes 101 and 102 are shown for reasons of clarity. The same reference signs are used to denote the same features as previously described. In order to aid explanation, each of the eight electrodes 101 and 102 shown is give an identifier. The four electrodes 101 (those that extend spatially in the X direction) are given the identifiers 1 to 4, while the four electrodes 102 (those that extend spatially in the Y direction) are given the identifiers A to D. As described previously, the electrodes 101 and 102 spatially intersect at various locations in the X-Y plane, and these points are herein referred to as intersection points. The various intersection points are denoted according to combinations of the identifiers of the corresponding electrodes 101 and 102. For example, the intersection of electrode A and electrode 1 is denoted as intersection point A1, the intersection of electrode B and electrode 2 is denoted as intersection point B2, etc. It should be understood that each of the intersection points corresponds to a position in the X-Y plane of the touch-sensitive element. In other words, the intersection points can be translated into two-dimensional Cartesian coordinates on the surface of the touch-sensitive element.

FIG. 4 further shows a conductive object O and touch 109 present on the touch sensitive surface. As can be seen the conductive object O covers intersection points B1, B2, C1 and C2. For the purposes of this discussion, it will be assumed that the conductive object O physically overlies these four intersection points, and as described below, electrically influences the mutual capacitance of these intersection points. However, it should be appreciated that the electrical influence of the conductive object O may extend beyond its physical extent. In other words, the conductive object O may electrically influence the mutual capacitive coupling at adjacent locations (intersection points) on the touch-sensitive element that those that directly correspond to the physical extent of the conductive object O. The touch 109 in FIG. 4 is shown at intersection point B2 in this example.

Figure 5:
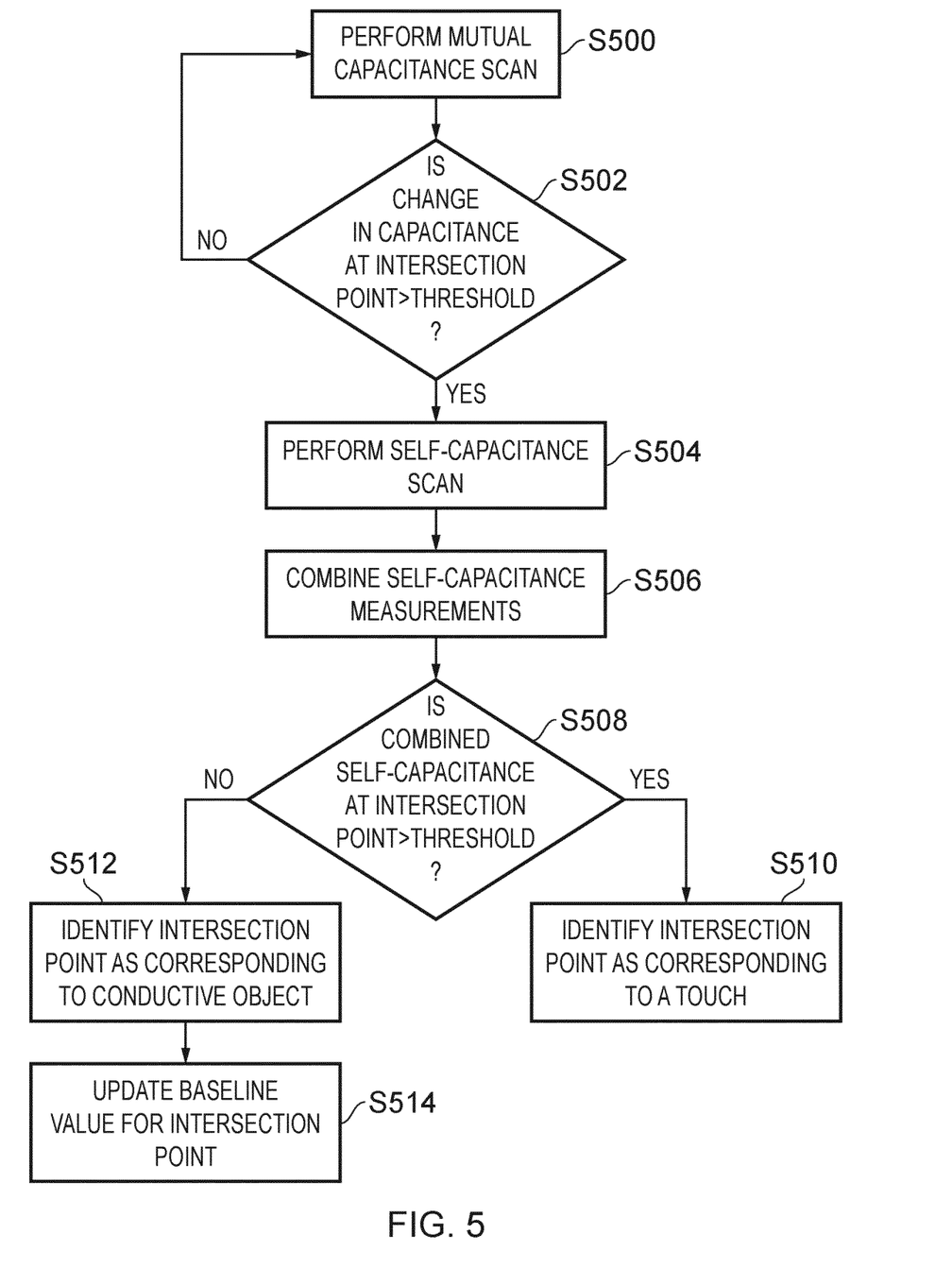
FIG. 5 illustrates a method for determining a touch on the touch sensitive area of the touch sensitive apparatus of FIG. 1, and for determining the presence of an object on the touch sensitive area of the touch sensitive apparatus in accordance with certain embodiments of the invention.

FIG. 5 is a flow diagram showing the method for operating the touch sensitive apparatus 1 according to aspects of the present disclosure. The method begins at step S500 where the touch sensitive apparatus performs a mutual capacitance scan. More specifically, the measurement circuitry 105 (under instruction from the processing circuitry 106) generates and applies a drive signal (e.g., a voltage signal) to each of the electrodes 101 (that is, electrodes 1, 2, 3, and 4 in FIG. 4). As discussed above in relation to FIG. 3, these electrodes 101 may be referred to as transmitting or transmit electrodes. The measurement circuitry 105 also measures the resultant electrical signal (e.g., a voltage) received at each of the receive electrodes 102 (that is, electrodes A, B, C, and D). In essence, the drive signal applied to the transmit electrodes 101 is electrically coupled to the receive electrodes 102 as described above, and the measurement circuitry 105 is able to measure the resultant electrical signal received at the receive electrodes 102 which is indicative of the mutual capacitance between a given transmit electrode and a given receive electrode.

There are a number of ways in which the measurement circuitry 105 may be configured to perform the mutual capacitive measurements on the electrode array. For example, in one implementation, the measurement circuitry 105 is configured to apply the drive signal sequentially to each electrode 1, 2, 3, and 4 of transmit electrodes 101, using e.g., a multiplexer. When the drive signal is applied to one of the electrodes 1, 2, 3, and 4, the measurement circuitry 105 is configured to sequentially couple each of the receive electrodes A, B, C and D and measure the corresponding electrical signal. In this way, the measurement circuitry 105 is able to obtain signals indicative of the capacitive coupling at each of the intersection points. This arrangement allows a single driver (i.e., the circuitry generating the drive signal) and a single receiver (i.e., the circuitry for receiving the resulting electrical signal) to be used which may reduce the overall cost of the touch sensitive apparatus 1. However, this approach can be time consuming as each of the (and in this example sixteen) intersection points is measured sequentially. In other implementations, each electrode is connected to either its own individual drive circuitry or its own individual receive circuitry, thus mitigating the need for multiplexers and simplifying the control process. In yet other implementations, each drive electrode 101 is drive in accordance with a unique signal, but all (or a group thereof) of the transmit electrodes 101 are driven simultaneously. Correspondingly, the measurement circuitry 105 is configured to receive the unique signals from all (or a group thereof) of the receive electrodes 102 simultaneously. By comparing the driven signals with the received signals, the measurement circuitry 105 can then determine which intersections points (if any) experience a change in capacitance. Such techniques offer the benefit of faster response times or improved sensitivity. It should be appreciated that the way in which the measurement circuitry 105 senses the capacitance at each intersection point is not significant to the principles of the present disclosure, and any of the above techniques, or any other suitable technique not mentioned explicitly, may be used.

The measurement circuitry 105 outputs values indicative of the capacitance at the intersection points to the processing circuitry 106. For example, the measurement circuitry 105 may output an average value of the measured voltage signal over a given measurement time period. The average value of the measured voltage changes (and in particular decreases) when a touch or conductive object is present at the intersection point as compared to when no touch or conductive object is present. That is, when a conductive object is present at an intersection point, the signal indicative of capacitance that is received at the receive electrode is reduced relative to when a conductive object is not present.

When the mutual scan is complete (or alternatively as the mutual scan is progressing) the processing circuitry 106, at step S502 of FIG. 5, is configured to determine at which intersection points there is determined to be a touch or conductive object present by comparing the measured value of the signal (i.e., the average voltage) to a threshold value.

In the described implementation, at step S502 the processing circuitry 106 is configured to determine, for each intersection point, when a change in the capacitive coupling is greater than a mutual capacitive threshold. More specifically, the processing circuitry 106 is configured to subtract a baseline value of the signal indicative of capacitance at an intersection point (which is a measure of the signal indicative of capacitance at the intersection point in the absence of a touch) from the measured signal indicative of capacitance for that intersection point to determine a change in the signal indicative of capacitance (or more broadly, a change in capacitance). Subtracting the baseline value from the measured value can normalise the signal per intersection point, such that a single threshold may be used for comparing the signals received from a plurality of intersection points. When the absolute value of the difference between the baseline value and the measure value is greater than (or equal to) the mutual capacitive threshold, the processing circuitry 106 determines that a touch or conductive object is present at that intersection point. The processing circuitry 106 may store in associated memory (not shown) a baseline value for each intersection point which is used to determine the change in the capacitive coupling.

However, in other implementations, the processing circuitry 106 is configured to compare either the raw value of the signal indicative of capacitance at an intersection point to the mutual capacitance threshold or the raw measured value subtracted from the baseline value, and, if the raw value is less than (or equal to) the threshold, determine that a touch or conductive object is present at that intersection point. Note that although reference is made to the mutual capacitive threshold in all the implementations described above, the actual value of the mutual capacitive threshold may be set differently for each implementation.

If the processing circuitry 106 determines at step S502 that the change in capacitance at at least one intersection point is greater than the mutual capacitance threshold, i.e., a "YES" at step S502, then the method proceeds to step S504.

As stated above, the processing circuitry 106 is unable at distinguish from the mutual capacitance measurements alone whether the change in mutual capacitance is as a result of a genuine touch from a user or from a conductive object O. With reference to the example of FIG. 4, the changes in mutual capacitance measurements for intersection points B1, C1, B2 and C2 are each greater than the mutual capacitance threshold due to the presence of conductive object O and/or touch 109, but the processing circuitry 106 is unable to identify intersection B2 as corresponding to touch 109. Therefore, at step S504, the processing circuitry 106 instructs the measurement circuitry 105 to perform a self-capacitive scan of electrodes 101 and 102. In response, the measurement circuitry 105 applies a drive signal to electrodes 101 while electrodes 102 are not coupled to the measurement circuitry 105, and subsequently applies a drive signal to electrodes 102 while electrodes 101 are not coupled to the measurement circuitry 105 (broadly in accordance with the techniques as described in relation to FIG. 2 above). The self-capacitance measurements are output to the processing circuitry 106.

It should be appreciated that, in accordance with the method described in FIG. 5, the self-capacitance scan of electrodes 101 and 102 is only performed if the processing circuitry 106 determines that the change in mutual capacitance for at least one intersection point is greater than the mutual capacitance threshold, otherwise the self-capacitance scan of electrodes 101 and 102 is not performed. This can be particularly advantageous as the self-capacitance scan takes processing resource and power to perform. Thus, the energy requirements can be reduced if the self-capacitance scan is selectively performed. However, in other implementations, the method may proceed directly from step S500 to S504 regardless of whether a touch or conductive object has been detected as a result of the mutual capacitance scan. That is, the processing circuitry may repeatedly request a mutual capacitance scan of the electrodes, followed by a self-capacitance scan of the electrodes (regardless of the result of the mutual capacitance scan of the electrode) and process all the received measurements to identify if a genuine touch(es) has been received.

In addition, to further save processing time and energy, in some implementations the self-capacitance scan may only be performed for the electrodes corresponding to the intersection points which are determined to have a change in the mutual capacitance greater than the mutual capacitance threshold. In the example according to FIG. 4, it can be determined from the mutual capacitance measurements that electrodes B and C and 1 and 2 are the electrodes for which a self-capacitance scan is required. Therefore, at step S504, the processing circuitry 106 can instruct the measurement circuitry 105 to perform self-capacitance measurements on electrodes 1, 2, B and C.

In other implementations, the mutual capacitance scan and self capacitance scans are performed repeatedly, regardless of whether or not one or both of the scans detect a touch or conductive object. That is, steps S500 and S504 are performed repeatedly. In these implementations, baseline values for the mutual capacitances and self capacitances at the intersection points can be regularly checked and/or updated based on the measured signals from the various electrodes and intersection points. This can help compensate for thermal drift in the capacitance measurements.

After receiving the self-capacitance measurements at processing circuitry 106 as a result of step S504, the processing circuitry at step 506 combines the self-capacitance measurements of electrodes 101 with the self-capacitance measurements of electrodes 102 corresponding to the intersection points. For example, the processing circuitry is configured to combine the self-capacitance measurement of electrode 1 with the self-capacitance measurement of electrode A, and separately with electrode B, etc. The two self-capacitance measurements are combined so as to increases the magnitude of the self-capacitance signal for a given intersection point, and in particular, the two self-capacitance signals are multiplied together. In other words, for each intersection point, a self-capacitance measurement is obtained which is the product of the self-capacitance measurement for electrode 101 and the self-capacitance measurement for the electrode 102. It should be appreciated that other functions, such as addition, may be employed as the combination.

In the present implementation, multiplying the self-capacitance measurements from two intersecting electrodes helps simplify the detection of a touch. The sensitivities (or signal strengths) in the row (Y-direction) and column (X-direction) electrodes when performing self-capacitance measurements may be different, and in some instances substantially different. For instance, as mentioned above, the X and Y electrodes may be disposed on opposite sides of a substrate. However, by multiplying the two values together, a single threshold can be set which can be compared against the multiplied signal in order to determine whether a touch is detected. For example, in the converse situation a threshold for the X electrodes and a different threshold for the Y electrodes would be required to be able to determine whether a touch is present in the X and Y electrodes respectively. This can simplify the processing steps for determining the presence of a touch.

At step S508, the combined self-capacitance measurement (corresponding to a given intersection point) is compared to a self-capacitance threshold. More specifically, processing circuitry 106 is configured to determine whether the combined self-capacitance measurement for a given intersection point is greater than (or equal to) a self-capacitance threshold. Similarly to as described in relation to the mutual capacitance scan, a self-capacitance baseline value for the intersection point (which is a value corresponding to the combination of the self-capacitance value of one electrode combined with the self-capacitance value of another electrode in the absence of a touch) may be subtracted from the combined measured values of the self-capacitances of the two electrodes to remove sources of noise from the signal and the value subsequently compared to a threshold. Alternatively, the raw values of the combination of the self-capacitance measurements are compared to a threshold.

As a further alternative, a change in the self-capacitance between the measured and baseline values may also be compared to a threshold.

If at step S508 the processing circuitry 106 determines the combined self-capacitance measurement is greater than (or equal to) a self-capacitance measurement, i.e., "YES" at step S508, then the method proceeds to step S510 where the processing circuitry determines that the given intersection point corresponds to a genuine touch from a user (e.g., from a user's finger or from a stylus) received on (or in close proximity to) the sensing surface of the touch sensitive-element. In other words, the processing circuitry 106 is configured to determine the presence of a genuine touch when the change in mutual capacitance at a given intersection point is greater than the mutual capacitance threshold and when the product of the self-capacitance measurements of the electrodes forming the intersection point is greater than the self-capacitance threshold.

As a result of the processing circuitry determining a genuine touch is present at step S510, the processing circuitry 106 outputs a signal to an associated apparatus that is electrically coupled to the touch sensitive apparatus 1.

Figure 6:
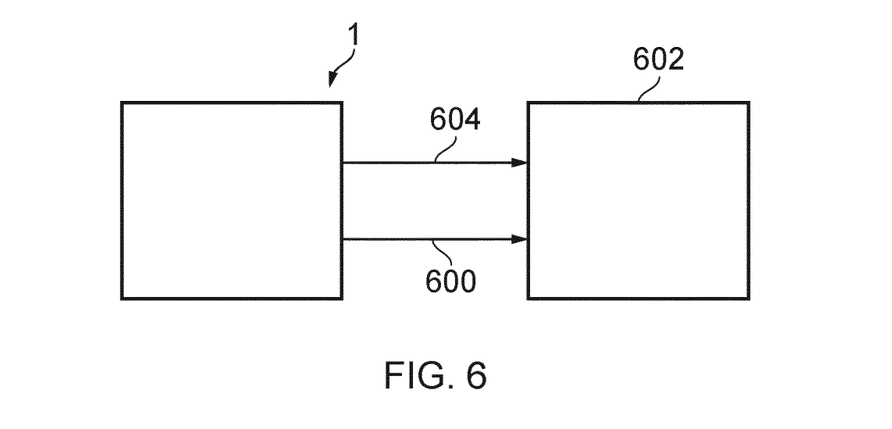
FIG. 6 schematically illustrates an example system which employs the touch sensitive apparatus of FIG. 1 in accordance with certain embodiments of the invention.

FIG. 6 is a highly schematic diagram showing the touch sensitive apparatus 1 coupled to an associated apparatus 602. The associated apparatus 602 generally comprises a computer processor which is capable of running a software application, and may also comprise a display element, such as an LCD screen or the like. In some implementations, the touch sensitive apparatus 1 is integrally formed with the associated apparatus 602, whereas in other implementations the touch sensitive apparatus 1 is able to be coupled to the associated apparatus 602 e.g., via electrical wiring. As described above, in some instances the substrate 103 and cover 108 of the touch sensitive apparatus 1 are transparent and a display element is placed behind the substrate 103 and cover 108, such as in a smartphone.

The touch sensitive apparatus 1 functions as an input mechanism for the associated apparatus 602. At step S510, the processing circuitry 106 outputs a signal 600 indicating the presence of a touch on the touch-sensitive element to the processing circuitry of the associated apparatus (not shown). In some applications, signal 600 may simply indicate whether or not a genuine touch has been detected on the touch-sensitive element, whereas in other instances, the signal 600 may indicate one or more positions of the touch or touches on the touch-sensitive element, for example as X, Y coordinates (corresponding to the intersection points). The processing circuitry of the associated apparatus 602 may process the signal 600 in accordance with the application being run on the associated apparatus, e.g., by causing the associated apparatus to perform an action or change the image(s) that is displayed on the display unit.

With reference back to FIG. 5, if at step S508 the processing circuitry 106 determines the combined self-capacitance measurement is less than a self-capacitance measurement, i.e., "NO" at step S508, then the method proceeds to step S512 where the processing circuitry determines that the given intersection point does not correspond to a genuine touch from a user (e.g., from a user's finger or from a stylus) received on (or in close proximity to) the sensing surface of the touch sensitive-element, but instead determines that a conductive object is present at the intersection point. In this instance, the processing circuitry 106 does not output the signal 600 in FIG. 6.

In some implementations, at step S512, processing circuitry 106 may output a signal 604 to the associated apparatus 602 indicating that a conductive object is present on the touch-sensitive element. The processing circuitry of the associated apparatus 602 may generate an indication for the user signifying that a conductive object is on the touch sensitive apparatus 1 and that the touch-sensitive element should be cleaned. However, it should be appreciated that signal 604 is optional.

In some implementations, when the method reaches steps S510 or S512, the method proceeds back to step S500 and the mutual scan is performed once again. The method may be cyclically repeated at a certain frequency (e.g., 10-20 Hz) and signal 600 output whenever a genuine touch is, or touches are, detected by processing circuitry 106. Although not shown in the method of FIG. 5, the processing circuitry 106 may not output signal 600 until after a number of measurements sets have been performed. A measurement set may be defined as a complete mutual capacitance scan; that is, one measurement set is one mutual capacitance scan. In other instances, a measurement set may be defined as a complete mutual capacitance scan and a complete (or partial) self-capacitance scan. The processing circuitry 106 may be configured to determine that there is a genuine touch detected for a given intersection point in multiple sequential measurement sets (e.g., two or more) before outputting the signal 600 to the associated apparatus. If there is a discrepancy between the measurement sets, the processing circuitry 106 is configured to not output the signal 600. This can help reduce the chance of a spurious signal 600 caused by noise being sent to the associated apparatus.

However, in other implementations, such as the one described by FIG. 5, in response to determining that a conductive object is present at the intersection point on the touch-sensitive element at step S512, the processing circuitry 106 is configured to update the baseline mutual capacitance value for that intersection point at step S514. As mentioned above, the processing circuitry 106 stores a baseline mutual capacitance value for each of the intersection points. In one example, during a calibration process, the mutual capacitance for each interaction point is measured by measurement circuitry 105 and the values are stored in the memory of the processing circuitry 106. Alternatively, the initial baseline values may be predetermined (i.e., during manufacture) and stored in memory of the processing circuitry 106.

At step S514, the processing circuitry is configured to replace the previously stored baseline mutual capacitance value for the intersection point with the measured capacitance value for the intersection point. By updating the baseline value in step S514, the intersection points at which a conductive object is present and no touch is detected are essentially ignored in subsequent mutual capacitance scans at step S500 and S502. This is because, while the presence of the conductive object changes the mutual capacitance at the intersection point as compared to when no conductive object is present, the change in measured mutual capacitance compared to the updated baseline value in step S502 is effectively zero. However, when a user subsequently touches the touch-sensitive element corresponding to an intersection point over which a conductive object is located and for which a baseline value has already been updated, for example at touch 109, the subsequent measured mutual capacitance is a combination of the capacitive reduction caused by the conductive object and the capacitive reduction caused by the touch 109. Thus, at step S502, the processing circuitry 106 is configured to identify that the change in mutual capacitance surpasses the mutual capacitance threshold value.

While it has been described that the processing circuitry 106 is configured to update baseline mutual capacitance measurement values for intersection points at which a conductive object, but not a touch, is identified, it should be appreciated that in other implementations, the processing circuitry 106 may store individual mutual capacitance threshold values for each of the intersection points. That is, rather than updating the baseline values, the processing circuitry 106 may instead be configured to update the mutual capacitance threshold value for that intersection point. A similar effect as described above, in that intersection points that are determined to have a conductive object above them are ignored in subsequent mutual capacitance scans, may also be achieved.

While the above has described the intersection points as points at which the electrodes spatially intersect, it should be appreciated that the electrodes may not spatially intersect, but rather be in close proximity to one another. The electric field generated by an electrode may be intersected by an adjacent electrode to define an intersection point. That is, the intersection point is to be understood as a point in space at which the electric field(s) of one electrode intersect a second electrode most strongly (in other words, the point at which the capacitive coupling is greatest).

Thus there has been described a touch-sensitive apparatus, the apparatus comprising: a touch-sensitive element comprising an array of electrodes having a first electrode and a second electrode, the second electrode spatially intersecting the first electrode at an intersection point; and measurement circuitry configured to: measure the mutual capacitance at the intersection point of the first and second electrodes; measure the self-capacitance of the first electrode, and measure the self-capacitance of the second electrode; and processing circuitry configured to: determine the presence of a touch on the touch-sensitive element on the basis of a comparison of the measured mutual capacitance at the intersection point to a first threshold and on the basis of a combination of the measured self-capacitance of the first electrode and the measured self-capacitance of the second electrode being greater than or equal to a second threshold.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A touch-sensitive apparatus, the apparatus comprising:
   a touch-sensitive element comprising an array of electrodes having a first electrode and a second electrode, the second electrode spatially intersecting the first electrode at an intersection point; and
   measurement circuitry configured to:
      measure the mutual capacitance at the intersection point of the first and second electrodes;
      measure the self-capacitance of the first electrode, and measure the self-capacitance of the second electrode; and
   processing circuitry configured to:
      determine the presence of a touch on the touch-sensitive element on the basis of a comparison of the measured mutual capacitance at the intersection point to a first threshold and on the basis of a combination of the measured self-capacitance of the first electrode and the measured self-capacitance of the second electrode being greater than or equal to a second threshold.

2. The touch-sensitive apparatus of claim 1, wherein the processing circuitry is configured to determine the presence of a galvanically isolated conductive object on the touch-sensitive element on the basis of a comparison of the measured mutual capacitance at the intersection point to the first threshold and on the basis of a combination of the measured self-capacitance of the first electrode and the measured self-capacitance of the second electrode being less than or equal to the second threshold.

3. The touch-sensitive apparatus of claim 1, wherein the processing circuitry is configured to calculate the product of the measured self-capacitance of the first electrode and the measured self-capacitance of the second electrode as the combination of the measured self-capacitance of the first electrode and the measured self-capacitance of the second electrode.

4. The touch-sensitive apparatus of claim 1, further comprising a plurality of intersection points corresponding to locations at where respective ones of the plurality of electrodes intersect, and wherein the processing circuitry is configured to determine the presence or absence of a touch on the touch-sensitive element at each of the plurality of intersection points.

5. The touch-sensitive apparatus of claim 4, wherein the processing circuitry is configured to calculate the product of the measured self-capacitances of any pair of intersecting electrodes corresponding to one of the intersection points, and wherein the processing circuitry is configured to compare the product of the measured self-capacitance of each of the pairs of electrodes with respect to the second threshold.

6. The touch-sensitive apparatus of claim 4, wherein the processing circuitry is configured to instruct the measurement circuitry to perform the self-capacitance measurements of the array of electrodes depending upon the result of the comparison of the measured mutual capacitance at the intersection point to the first threshold.

7. The touch-sensitive apparatus of claim 6, wherein the processing circuitry is configured to instruct the measurement circuitry to perform the self-capacitance measurements on the electrodes corresponding to ones of the plurality of intersection points at which it is determined that the comparison of the measured mutual capacitance at the intersection point to the first threshold corresponds to the presence of a touch or the presence of a galvanically isolated conductive object at the intersection point.

8. The touch-sensitive apparatus of claim 1, wherein the processing circuitry is configured to determine a change in the measured mutual capacitance by calculating the difference between the measured mutual capacitance at the intersection point and a reference value, and to determine the presence of a touch on the touch-sensitive element when the change in the measured mutual capacitance is greater than or equal to the first threshold and when the combination of the measured self-capacitance of the first electrode and the measured self-capacitance of the second electrode is greater than or equal to the second threshold.

9. The touch-sensitive apparatus of claim 8, wherein the processing circuitry is configured to determine that no touch is present on the touch-sensitive element when one or both of: the change in measured mutual capacitance at the intersection point is less than the first threshold, and the combination of the measured self-capacitance of the first electrode and the self-capacitance of the second electrode is less than the second threshold.

10. The touch-sensitive apparatus of claim 8, wherein the reference value is a value of the mutual capacitance between the first and second electrodes in the absence of a touch and a galvanically isolated conductive object on the touch-sensitive element.

11. The touch-sensitive apparatus of claim 8, wherein each intersection point has a corresponding reference value, and wherein the processing circuitry is configured to update the reference value with the measured mutual capacitance value when it is determined that a galvanically isolated conductive object is present on the touch-sensitive element at the intersection point.

12. A system comprising the touch-sensitive apparatus of claim 1, further comprising system processing circuitry communicatively coupled to the processing circuitry of the touch-sensitive apparatus.

13. The system of claim 12, wherein the system processing circuitry is configured to cause the system to perform a first action in response to receiving a signal output from the processing circuitry of the touch-sensitive apparatus indicating the presence of a touch on the touch-sensitive element.

14. The system of claim 12, wherein the system processing circuitry is configured to cause the system to perform a second action in response to receiving a signal output from the processing circuitry of the touch-sensitive apparatus indicating the presence of a galvanically isolated conductive object on the touch-sensitive element.

15. A method for determining the presence of a touch on a touch-sensitive element of a touch-sensitive apparatus, the apparatus comprising the touch-sensitive element comprising an array of electrodes having a first electrode and a second electrode, the second electrode spatially intersecting the first electrode at an intersection point, the method comprising:
   measuring the mutual capacitance at the intersection point of the first and second electrodes;
   comparing the measured mutual capacitance at the intersection point to a first threshold to determine whether a touch and/or a galvanically isolated conductive object is present at the intersection point;
   measuring the self-capacitance of the first electrode;
   measuring the self-capacitance of the second electrode; and
   determining the presence of a touch on the touch-sensitive element on the basis of the comparison of the measured mutual capacitance at the intersection point to the first threshold and on the basis of a combination of the measured self-capacitance of the first electrode and the measured self-capacitance of the second electrode being greater than or equal to a second threshold.

16. The method of claim 15, wherein measuring the self-capacitance of the first electrode and measuring the self-capacitance of the second electrode occur in response to the determining that a touch and/or a galvanically isolated conductive object is present at the intersection point.

* * * * *